US009785452B2

(12) United States Patent
Nandagopal et al.

(10) Patent No.: US 9,785,452 B2
(45) Date of Patent: Oct. 10, 2017

(54) FRAMEWORK FOR DEPENDENCY MANAGEMENT AND AUTOMATIC FILE LOAD IN A NETWORK ENVIRONMENT

(71) Applicant: CISCO TECHNOLOGY, INC., San Jose, CA (US)

(72) Inventors: Lokesh Kumar Nandagopal, Bangalore (IN); Deepesh Eliyot, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 431 days.

(21) Appl. No.: 14/049,999

(22) Filed: Oct. 9, 2013

(65) Prior Publication Data

US 2015/0100879 A1   Apr. 9, 2015

(51) Int. Cl.
*G06F 9/44* (2006.01)
*G06F 9/445* (2006.01)
*G06F 17/30* (2006.01)

(52) U.S. Cl.
CPC .... *G06F 9/44521* (2013.01); *G06F 17/30899* (2013.01)

(58) Field of Classification Search
CPC ............... G06F 17/2247; G06F 17/227; G06F 17/30905; G06F 17/3089; G06F 17/24
USPC .................................................. 715/235, 749
See application file for complete search history.

(56) References Cited

U.S. PATENT DOCUMENTS

| | | | | |
|---|---|---|---|---|
| 8,181,107 B2 * | 5/2012 | Melnyk | ............. | G06F 17/30905 715/238 |
| 8,732,855 B2 * | 5/2014 | Thomas | ........................ | 715/745 |
| 8,887,132 B1 * | 11/2014 | Hunter | ................ | G06F 9/44505 717/111 |
| 8,949,781 B1 * | 2/2015 | Orcutt | ............................ | 717/109 |
| 8,954,583 B1 * | 2/2015 | Zhou | ........................ | H04L 67/42 709/224 |

(Continued)

OTHER PUBLICATIONS

N. Wilde, "Understanding Program Dependencies," Software Engineering Institute, Carnegie Mellon University, Pittsburgh, Pennsylvania, Curriculum Module CMU/SEI-90-CM-026 (Aug. 1990), 31 pages; http://citeseerx.ist.psu.edu/viewdoc/download?doi=10.1.1.52.4892&rep=rep1&type=pdf.

*Primary Examiner* — Scott Baderman
*Assistant Examiner* — Hassan Mrabi
(74) *Attorney, Agent, or Firm* — Polsinelli PC

(57) ABSTRACT

An example method for facilitating a framework for dependency management and automatic file load in a network environment is provided and includes deriving dependencies and loading methods of JavaScript files and Cascading Style Sheets (CSS) files referenced by an application source code executing at a browser on a client in a network environment, where the dependencies and loading methods are derived according to a map file accessed from a server, and automatically loading the JavaScript files and CSS files according to the dependencies and loading methods. In a specific embodiment, the map file comprises an Extensible Markup Language (XML) configuration file, which is generated by parsing each JavaScript file for the dependencies and the loading methods. In another embodiment, the map file comprises a JavaScript Object Notation (JSON) file, which is generated by parsing each JavaScript file and CSS file for methods and class names, respectively.

19 Claims, 7 Drawing Sheets

(56) References Cited

U.S. PATENT DOCUMENTS

| | | | | |
|---|---|---|---|---|
| 8,997,072 B1* | 3/2015 | Wong | G06F 17/30876 | 717/151 |
| 2003/0033448 A1* | 2/2003 | Kieffer | G06F 9/445 | 719/331 |
| 2003/0033607 A1* | 2/2003 | Schwalb | G06F 9/4443 | 725/112 |
| 2003/0058277 A1* | 3/2003 | Bowman-Amuah | G06F 17/30607 | 715/765 |
| 2008/0109250 A1* | 5/2008 | Walker | G06F 17/2247 | 705/2 |
| 2008/0139191 A1* | 6/2008 | Melnyk | G06F 17/30905 | 455/419 |
| 2008/0307394 A1* | 12/2008 | Marchant | G06F 9/44521 | 717/120 |
| 2009/0013336 A1* | 1/2009 | Backhouse | G06F 8/38 | 719/328 |
| 2009/0157627 A1* | 6/2009 | Arthursson | G06F 9/45504 | |
| 2009/0210781 A1* | 8/2009 | Hagerott | G06F 9/4443 | 715/234 |
| 2010/0169863 A1* | 7/2010 | Adams | G06F 9/44521 | 717/120 |
| 2011/0010690 A1* | 1/2011 | Howard | G06F 8/456 | 717/120 |
| 2011/0054878 A1* | 3/2011 | Zhang | G06F 11/3419 | 703/21 |
| 2011/0296381 A1* | 12/2011 | Mooney | G06F 8/423 | 717/122 |
| 2012/0005382 A1* | 1/2012 | Chatterjee | G06F 13/102 | 710/105 |
| 2012/0079361 A1* | 3/2012 | Itoko | G06F 17/3089 | 715/205 |
| 2012/0110433 A1* | 5/2012 | Pan | G06F 17/211 | 715/234 |
| 2013/0007706 A1* | 1/2013 | Burckart | G06F 8/71 | 717/120 |
| 2013/0055063 A1* | 2/2013 | Mondal | G06F 9/4552 | 715/234 |
| 2013/0159976 A1* | 6/2013 | Jazdzewski | G06F 8/443 | 717/126 |
| 2013/0159978 A1* | 6/2013 | Jazdzewski | G06F 11/3636 | 717/129 |
| 2013/0226992 A1* | 8/2013 | Bapst | G06F 17/30902 | 709/203 |
| 2014/0108911 A1* | 4/2014 | Damale | H04L 67/22 | 715/234 |
| 2014/0109106 A1* | 4/2014 | Fanning | G06F 8/433 | 718/106 |
| 2014/0280479 A1* | 9/2014 | Kazerani | H04L 67/20 | 709/203 |
| 2014/0280515 A1* | 9/2014 | Wei | H04L 67/02 | 709/203 |
| 2014/0281918 A1* | 9/2014 | Wei | H04L 67/02 | 715/234 |
| 2014/0359430 A1* | 12/2014 | Jacob | G06T 13/00 | 715/236 |
| 2015/0046789 A1* | 2/2015 | Wei | G06F 9/4445 | 715/234 |
| 2015/0067641 A1* | 3/2015 | Nyisztor | H04L 41/082 | 717/121 |
| 2015/0286394 A1* | 10/2015 | Koval | H04L 67/06 | 713/156 |

* cited by examiner

```
<js id='js1'>
<name>js1</name>
<dependencies>
<dependency id='js2' lazyload='true'></dependency>
<dependency id='js3' lazyload='false'></dependency>
</dependencies>
</js>
```

```
{
"Bootstrap":    {"page1.jsp":["/html/js/test_init1.js","/html/css/css_init1.css"],"page2.jsp":
["/html/js/test_init2.js","/html/css/css_init2.css"]}
"Javascripts": [
        {
                "relative_script_path":"/html/js/test1.js",
                "methods_available": ["test1_method1", "test1_method2"],
                "global_variables":["test1_var1","test1_var2"]
        },
        {
                "relative_script_path":"/html/js/test2.js",
                "methods_available": ["test2_method1", "test2_method2"],
                "global_variables":""
        },
        {
                "relative_script_path":"/html/js/test3.js",
                "methods_available": ["test3_method1", "test3_method2"],
                "global_variables":""
        }
        ],
"CSS": [
        {
                "relative_css_path":"/html/css/test1.css",
                "class_names": ["test1_class1", "test1_class2"]
        },
        {
                "relative_css_path":"/html/css/test2.css",
                "class_names": ["test2_class1", "test2_class2"]
        }
        ]
}
```

US 9,785,452 B2

FRAMEWORK FOR DEPENDENCY MANAGEMENT AND AUTOMATIC FILE LOAD IN A NETWORK ENVIRONMENT

TECHNICAL FIELD

This disclosure relates in general to the field of communications and, more particularly, to a framework for dependency management and automatic file load in a network environment.

BACKGROUND

The Web is evolving at a fast pace, with increasing amount of innovation in Web technologies, applications, infrastructure and services. One of the latest trends is hyper-text markup language 5 (HTML5), which has integrated the capabilities and richness of native applications to the Web platform. Integration of JavaScript and Cascading Style Sheets (CSS) with HTML5 permits great looking effects, animations and content in a self-contained, platform-agnostic way on various browsers. For example, graphics libraries like WebGL can extend JavaScript, allowing for creation of interactive 3D graphics within the browser while utilizing a plugin-free nature of an HTML5 canvas element. Such web applications and pages utilizing HTML5 with JavaScript and CSS can improve user experience, but may use computer resources intensively.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 8 is a simplified diagram illustrating yet other example details of an embodiment of the communication system;

DETAILED DESCRIPTION OF EXAMPLE EMBODIMENTS

Overview

An example method for facilitating a framework for dependency management and automatic file load in a network environment is provided and includes deriving dependencies and loading methods of JavaScript files and Cascading Style Sheets (CSS) files referenced by an application source code executing at a browser on a client in a network environment, where the dependencies and loading methods are derived according to a map file accessed from a server, and automatically loading the JavaScript files and CSS files according to the dependencies and loading methods. As used herein, "loading" is a process of copying a computer program from a storage device, such as a hard disk drive of a server, into local memory, such as at the client (generally, every computer program must be loaded into memory before it can be executed). In a specific embodiment, the map file comprises an Extensible Markup Language (XML) configuration file, which is generated by parsing each JavaScript file for the dependencies and the loading methods. In another embodiment, the map file comprises a JavaScript Object Notation (JSON) file, which is generated by parsing each JavaScript file and CSS file for methods and class names, respectively.

EXAMPLE EMBODIMENTS

Figure 1:
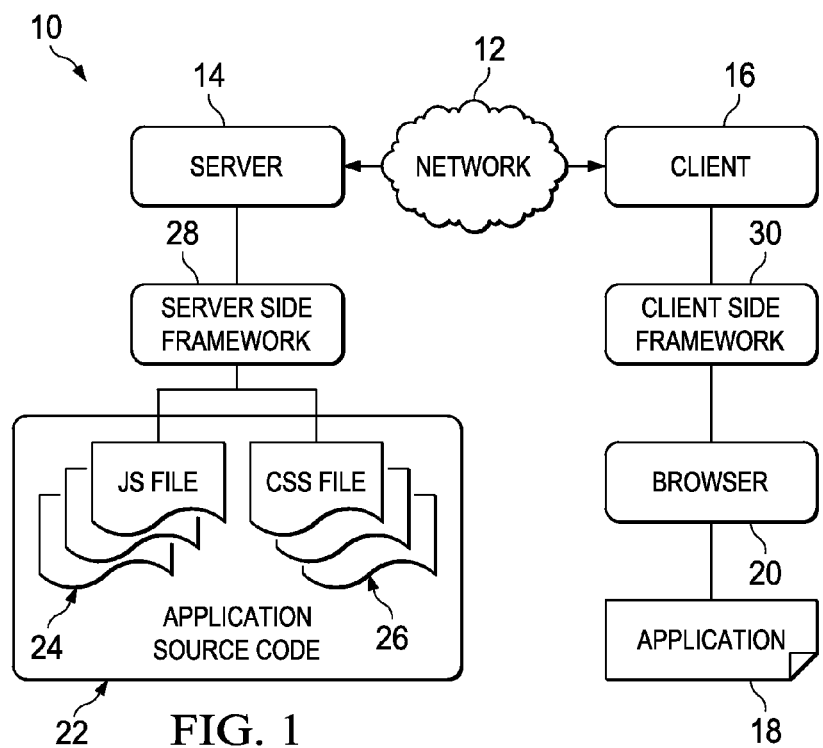
FIG. 1 is a simplified block diagram illustrating a communication system to facilitate a framework for dependency management and automatic file load in a network environment.

Turning to FIG. 1, FIG. 1 is a simplified block diagram illustrating an embodiment of communication system 10 for facilitating implementation of VXLAN in ToR switches in a network environment. Communication system 10 includes a network 12 facilitating communication between a server 14 and a client 16, for example, to display an application 18 on a browser 20 at client 16. To display application 18 at client 16, browser 20 may process (e.g., interpret and execute) an application source code 22, comprising one or more JavaScript files 24 and CSS files 26, stored at server 14 and retrieved therefrom. In some embodiments, each JavaScript file 24 may include dependencies to one or more other JavaScript files 24. As used herein, the term "dependency" refers to a relationship (e.g., logical coupling) by which each program component (e.g., object, data, variables, subprograms, etc.) relies on each one of the other program components. Thus, a dependency exists between two program components if a change to one may have an impact that will require changes to the other. Note that an application" as used in this Specification, can be inclusive of an executable file comprising instructions that can be understood and processed on a computer, such as a web page encoded in HTML format, and may further include library modules loaded during execution, object files, system files, hardware logic, software logic, or any other executable modules.

A server side framework 28 and a client side framework 30 can facilitate dependency management and automatic file load of JavaScript files 24 and CSS files 26 to enable browser 20 to automatically load and execute JavaScript files 24 and CSS files 26 accurately and completely with minimal memory resource usage. In various embodiments, server side framework 28 and client side framework 30 can automate loading of JavaScript files 24 at runtime, for example, using appropriate XML based configuration files.

In addition, server side framework 28 and client side framework 30 can facilitate dynamic JavaScript/CSS file loading, for example, by generating appropriate automatic reverse dependency maps at client 16, potentially reducing and optimizing code.

As used herein, the term "client" includes computer hardware or software that accesses a service made available by a server on the same or different computer system. A "server" is a software program, or the computer on which that program executes, that provides a specific kind of service to client software executing on the same computer or other computers communicating over a network. A "browser" is a computer program for retrieving, presenting and traversing information resources (e.g., web page, image, video or other piece of content identified by a Uniform Resource Identifier (URI/URL)) over a network, such as network 12.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

JavaScript is an interpreted computer programming language that, as part of browsers, allows scripts executing on the client to interact with a user, control the browser, communicate asynchronously, and alter the application content that is displayed on the browser. The most common use of JavaScript is to write functions (e.g., loading new application content, submitting user entered data to the server without reloading the application, animation of screen elements, etc.) that are embedded in or included from applications, such as web pages (e.g., HTML pages) and that interact with a Document Object Model (DOM) of the application. Because JavaScript code can execute locally in the user's browser (rather than on a remote server), the browser can respond to user actions quickly, making the application more responsive.

Generally, all the JavaScript files related to a certain application are loaded immediately during application load. For example, external JavaScript and CSS files may be loaded synchronously (e.g., as they are encountered) on a web page by including a reference to them in a HEAD section of the HTML source code of the web page. To load the JavaScript or CSS file asynchronously, DOM methods may be used to first create a new "SCRIPT" or "LINK" element that calls the JavaScript or CSS file, assigns it appropriate attributes, and adds the element to a desired location within the document tree.

However, unless every user interacts with everything on the application, much of the application source code may be a waste of the user's bandwidth (e.g., in a mobile or satellite Internet network), or computer memory resources. Memory usage can be rendered more efficient through lazy loading. Lazy loading is a design pattern commonly used in computer programming to defer initialization of an object (e.g., JavaScript or CSS file or object) until it is needed (e.g., when called by the executable file). Lazy loading can make code much more efficient and help manage memory usage. For example, if a button on a web page shows a completely different screen to the user once it is pressed, loading the code for the different screen right away when the web page is loaded may be unnecessary. Instead, with lazy loading, the different screen can be loaded when the button is pressed for the first time. Subsequently, the code for the different screen will be cached (if caching is enabled), so that the screen may load faster in a next visit.

One of the effects of lazy loading is a change in resolution scope with a dependency in the code. To explain dependencies in more detail, consider an example JavaScript js1.js, which depends on js2.js, which in turn, depends on js3.js. Each developer who wants to use js1.js has to parse through its code, determine its dependencies, and manually include the three JavaScript files in the header of the web page source code, so that all three JavaScript files are loaded and ready to be used when js1.js is called. In a general sense, dependencies can be determined by textual search (e.g., if one wants to find all the places where the data item INPUT_RECORD is changed, one solution is to search the entire source code for the string "INPUT_RECORD"); cross-referencing (e.g., by parsing the code and listing all references to one or more program components); data flow methods (e.g., using detailed data flow analysis to define program subsets that are dependent); etc. In such a "normal" dependency, the resolution scope contains immediate dependencies (e.g., js2.js) followed by their dependencies (e.g., js3.js), whereas, for a lazily loaded object, the resolution scope ends with its first-level dependencies (e.g., js3.js), because dependents are loaded only if specifically requested.

There are several manual methods that allow lazy loading of JavaScript and CSS files that include dependencies. However, all such methods require the dependencies to be explicitly declared apriori (e.g., before runtime) in the JavaScript or web page source code. Script Tag Append is an example of such an approach to load dependencies. In Script Tag Append, the dependency name is manually passed through a mapping strategy to derive a uniform resource locator (URL) for the JavaScript source file. Then a <script> tag with its src attribute (the src attribute instructs the browser to look at a particular location on the server for the image that is to be presented to the user) set to the derived URL is manually appended to the DOM.

In another example, the resource identified by the derived URL is retrieved in a synchronous XML hyper-text transfer protocol (HTTP) Request (XHR) call, which downloads the script's source code into a JavaScript string. In another example used with JavaScript, RequireJS is used to load JavaScript modules; in RequireJS, dependencies are manually configured when loading files, for example, using a "require( )" function in the source code to specify the dependencies. The developer has to manually code the dependencies in the require function. When the number of dependencies is large, manual coding of dependencies can become tedious and error prone.

Communication system 10 is configured to address these issues (and others) in offering a system and method to facilitate a framework for dependency management and automatic file load in a network environment. According to various embodiments, client side framework 30 may derive dependencies and loading methods of JavaScript files 24 and CSS files 26 referenced by application source code 22 executing at browser 18 on client 16 according to a map file accessed from server 14. Client side framework 30 may load JavaScript files 24 and CSS files 26 according to the dependencies and loading methods.

In an example embodiment, the map file comprises an XML configuration file, which may be generated by parsing each JavaScript file 24 for the dependencies and the loading methods. In another example embodiment, the map file comprises a JavaScript Object Notation (JSON) file, which may be generated by parsing each JavaScript file 24 and CSS file 26 for methods and class names, respectively. The JSON file may be reverse mapped at client 16 to derive the dependencies and loading methods.

According to various embodiments, deriving the dependencies and loading methods of JavaScript files 24 can comprise intercepting each JavaScript call in the executing source code 22 and checking the JavaScript call for dependency resolution according to the map file. The map file can specify a first set of dependent JavaScript files 24 to be lazily loaded and a second set of JavaScript files 24 to be loaded during initial application load. Client side framework 30 may determine whether a particular JavaScript file 24 is to be lazily loaded automatically based on the map file. Client side framework 30 may load JavaScript files 24 lazily or at initial application load according to the map file.

For example, consider a JavaScript file js1.js that depends on js2.js and js3.js, of which only js2.js is to be lazy loaded (e.g., js3.js is to be loaded when js1.js is loaded and js2.js is to be loaded only when called in the js1.js script). Client side framework 30 may resolve the dependencies at runtime (e.g., during execution of application source code 22) when it encounters a JavaScript call in application source code 22. In various embodiments, server side framework 28 may parse each JavaScript file 24 to determine the dependencies and loading method (e.g., lazy loading or loading at initial application load) and generate the XML configuration file accordingly. In some embodiments, the XML configuration file can also be manually created and edited according to application needs to facilitate loading the relevant JavaScript files lazily, or at initial application load, as appropriate.

According to various embodiments, deriving the dependencies and loading methods of CSS files 26 can comprise parsing the map file, where the executing application source code specifies onload (e.g., onload is most often used within the <body> element to execute a script once a web page has completely loaded all content including images, script files, etc.) of a page in application 20, determining related class names used on the page, reverse mapping the map file using the class names to determine respective CSS files 26, and asynchronously loading CSS files 26 based on the reverse mapping. Note that in some embodiments, the JSON file can specify substantially all JavaScript files and CSS files that are to be loaded asynchronously and certain other JavaScript files and CSS files to be loaded directly at initial application load, whereas any JavaScript files and CSS files excluded from asynchronous loading and loading directly at initial application load may be specified in a separate exclusion file located at server 14.

In some embodiments, if the map file is not found, client side framework 30 may generate a dependency tree that includes dependencies between a plurality of JavaScript files 24, and each dependent JavaScript file 24 may be lazily loaded according to the dependency tree. Thus, unlike typical cases where substantially all JavaScript files 24 are loaded upon initial application load, embodiments of communication system 10 may facilitate lazily loading substantially all JavaScript files 24. In some embodiments, unused JavaScript files 24 are tracked and deleted from the memory appropriately.

Turning to the infrastructure of communication system 10, the network topology can include any number of servers, service nodes, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications.

Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, LANs, wireless local area networks (WLANs), VLANs, metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Server side framework 28 and client side framework 30 includes one or more computer program modules (e.g., objects, applications, files, etc.) that execute on server 14 and client 16 respectively, using appropriate processors and memory elements at suitable network elements. As used herein, the term "network element" is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server 14 may execute on a computer, on which server side framework 28 also executes. In another example, server 14 may execute on a computer, and server side framework 28 may execute on another network element (e.g., switch) in communication with the computer. Similarly, client side framework 30 may execute in the same or different network element as client 16. Various suitable configurations and execution scenarios are included within the broad scope of the embodiments.

Embodiments of communication system 10 may be extended to interface with various JavaScript frameworks like Dojo, jQuery, etc. Because the dependent JavaScript files are loaded only when referenced (e.g., lazily loaded), an initial memory footprint on browser 16 may be low. In addition, merely the required JavaScript files 24 may be loaded at any point in time. Since the framework loads JavaScript files 24, it can also keep a track of the unused files and delete them from memory, appropriately.

Figure 2:
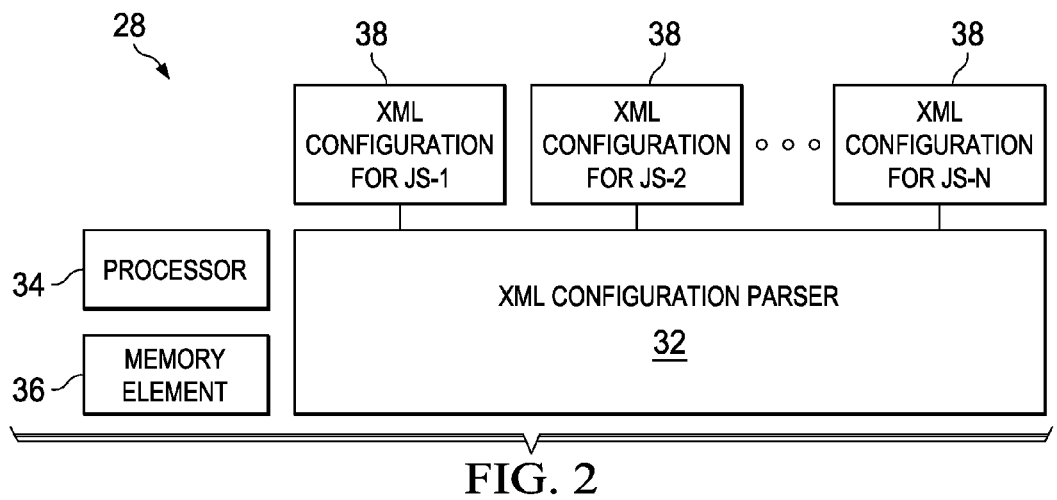
FIG. 2 is a simplified block diagram illustrating example details of an embodiment of the communication system.

Turning to FIG. 2, FIG. 2 is a simplified block diagram illustrating example details of server side framework 28 according to an embodiment of communication system 10. Server side framework 28 can include an XML configuration parser 32 that may execute using a processor 34 and a memory element 36. XML configuration parser 32 may parse JavaScript files 24 (e.g., JS-1, JS-2, . . . JS-N) and generate respective XML configuration files 38. For example, assume that JavaScript file JS-1 includes dependencies on JS-2 and JS-3, of which JS-2 is to be lazily loaded, and JS-3 is to be loaded upon initial application load. XML configuration file 38 for JS-1 may specify that JS-2 and JS-3 are dependent files, and JS-2 is to be lazily loaded.

Figure 3:
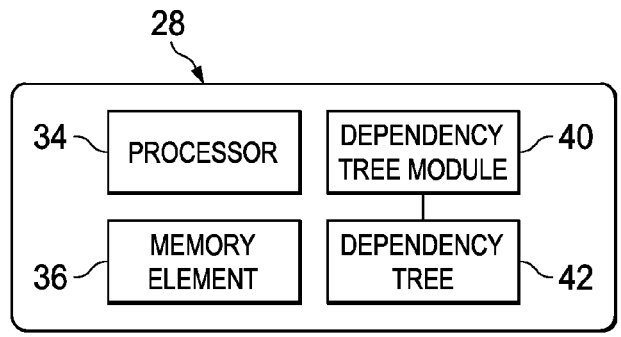
FIG. 3 is a simplified block diagram illustrating other example details of an embodiment of the communication system.

Turning to FIG. 3, FIG. 3 is a simplified block diagram illustrating example details of server side framework 28 according to another embodiment of communication system 10. In some embodiments, server side framework 28 may comprise a dependency tree module 40, which may generate a dependency tree 42. At deployment, dependency tree module 56 may read substantially all JavaScript files 24 and create dependency tree 42. For example, dependency tree module 56 may parse (e.g., read through) substantially all JavaScript files 24 one by one. When a first JavaScript load command is encountered, dependency tree module 56 may read through substantially all JavaScript files 24 to create dependency tree 42. Dependency tree 42 can be used for automatic loading of JavaScript files 24 at runtime (e.g., during execution of application source code 22) without requiring any XML configuration file 38 and to free up objects. However, substantially all JavaScript files 24 may be asynchronously lazily loaded according to the dependency tree (without any option to specific some JavaScript files to be lazily loaded, and some to be loaded initially at application load).

Figure 4:
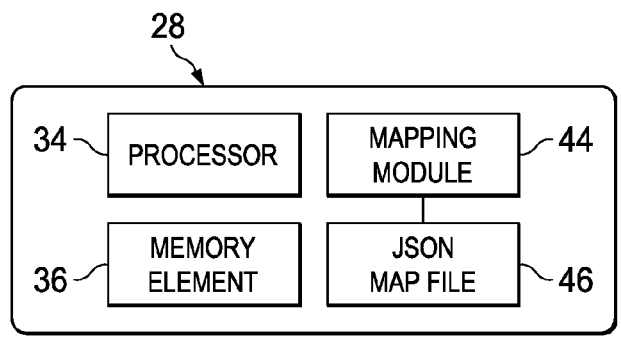
FIG. 4 is a simplified block diagram illustrating yet other example details of an embodiment of the communication system.

Turning to FIG. 4, FIG. 4 is a simplified block diagram illustrating example details of server side framework 28 according to yet another embodiment of communication system 10. Server side framework 28 can include a mapping module 44, which may execute using processor 34 and memory element 36. Mapping module 44 may be loaded as part of a Web-server/Application Server in some embodiments. Mapping module 44 may constantly monitor JavaScript files 24 and CSS files 26, and other related files (e.g., specifying files to be synchronously loaded, asynchronously loaded, etc.), changes and conflicts of each application 20, and may create individual mapped-repository files for each application 20 in JSON format. For example, mapping module 44 may parse JavaScript files 24 and CSS files 26, pre-calculate dependencies for browser 16, and generate a JSON map file 46 in JSON format. JSON map file 46 may include methods used in JavaScript files 24 and class names used in CSS files 26, such that a reverse map (e.g., at client 16) of the methods and class names in JSON map file 46 can indicate the specific JavaScript files 24 and CSS files 26.

Figure 5:
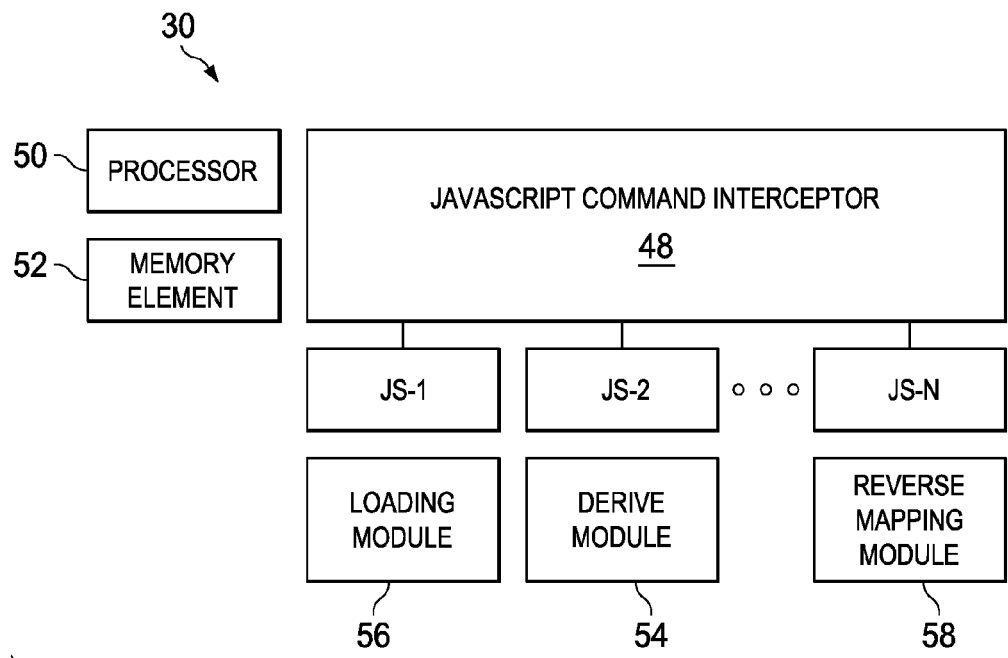
FIG. 5 is a simplified block diagram illustrating yet other example details of an embodiment of the communication system.

Turning to FIG. 5, FIG. 5 is a simplified block diagram illustrating example details of client side framework 30 according to an embodiment of communication system 10. A JavaScript command interceptor 48 may function using processor 50 and memory element 52. JavaScript command interceptor 48 may intercept each JavaScript call in executing application source code 22. For example, a JavaScript tag in application source code 22 may be used to identify a beginning of the JavaScript code section within application source code 22. Upon encountering the JavaScript tag, browser 18 may pass execution control to JavaScript command interceptor 48. Various other mechanisms to intercept JavaScript calls may be included within the broad scope of the embodiments.

A parsing module 54 may parse the map file (e.g., XML configuration file 38 or JSON map file 46) to check for dependency resolution according to the map file, for example, to derive dependencies and loading methods for JavaScript files 24. In one example, parsing module 54 may parse the map file to identify any dependent JavaScript file to be loaded. If the dependent file is to be lazily loaded according to the map file, a loading module 56 may load the dependent file only when called by the appropriate script. In some cases, the lazy loading can avoid an increased memory foot print at load time. In addition, specifying the dependency in a separate map file can provide separate of concerns, where the JavaScript files 24 need not be tightly coupled to each other; the separate map file that specifies the JavaScript dependencies can provide loose coupling for JavaScript files 24.

Loading module 56 may load appropriate JavaScript files 24 lazily or upon initial application load, depending on the specifications of the map file. In some embodiments, parsing module 54 may parse the map file and determine related class names used on a page that is onload. A reverse mapping module 58 may use the class names to determine respective CSS files 26 and loading module 56 may appropriately load CSS files 26.

Figures 6, 7:
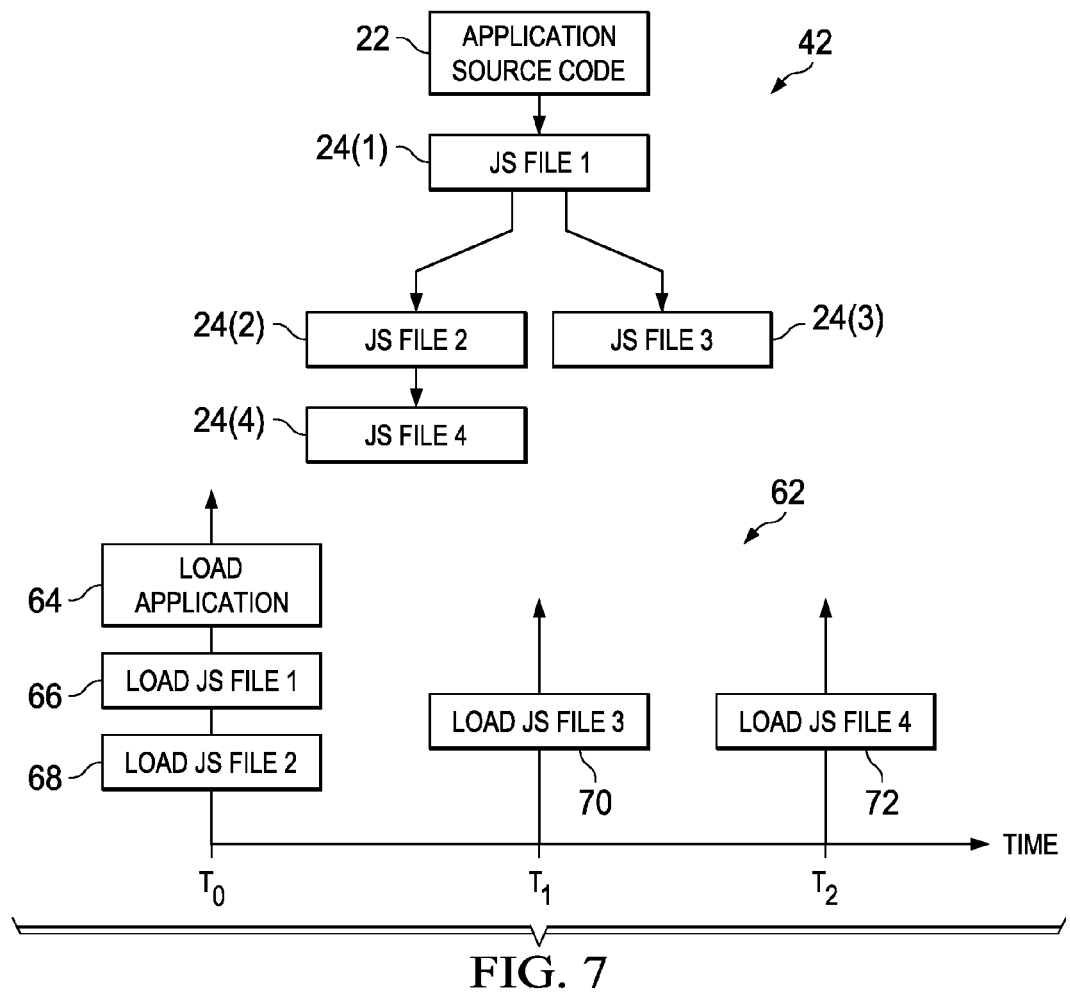
FIG. 6 is a simplified diagram illustrating yet other example details of an embodiment of the communication system.
FIG. 7 is a simplified block diagram illustrating yet other example details of an embodiment of the communication system.

Turning to FIG. 6, FIG. 6 is a simplified diagram illustrating example details 60 of XML configuration file 38 according to an embodiment of communication system 10. Details 60 can include an attribute "name" specifying the particular JavaScript file to which the XML configuration file corresponds. In the example illustrated in the figure, JavaScript file js1 depends on js2 and js3, with js2 to be lazily loaded, and js3 to be loaded during initial application load. Thus, the XML configuration attributes specify a dependency id corresponding to the dependent file name, and a lazyload attribute value of true (for lazy loading) and false (for loading at initial application load). Note that the details illustrated herein are merely for example purposes and are not intended to be limitations. Any suitable attribute and corresponding value to indicate the nature of the dependency and loading method may be included in the XML configuration file within the broad scope of the embodiments.

Turning to FIG. 7, FIG. 7 is a simplified block diagram illustrating an example dependency tree 42 and a sequence diagram 62 for the illustrated dependency tree. Assume, merely for example purposes and not as limitations, that application source code 22 includes a JavaScript call to JavaScript file 24(1) (JS FILE 1), which in turn calls JavaScript files 24(2) (JS FILE 2) and 24(3)(JS FILE 3). JavaScript file 24(2)(JS FILE 2) may in turn call JavaScript file 24(4)(JS FILE 4). Also assume that JS FILE 1 and JS FILE 2 is to be loaded at initial application load, followed by lazy loading of JS FILE 3, which is called before JS FILE 4. JS FILE 4 is to be lazy loaded when called after JS FILE 3 (if at all). Thus, XML configuration file 38 for JS FILE 1 may specify dependencies on JS FILE 2 and JS FILE 3 (but not JS FILE 4), and indicate that JS FILE 2 is not to be lazily loaded, whereas JS FILE 3 is to be lazily loaded. XML configuration file 38 for JS FILE 2 may specify its dependency on JS FILE 4 to be lazily loaded.

According to sequence diagram 62, a time variable is indicated on an X-axis and events occurring at specific times are indicated by vertical arrows. At time $T_0$, application 20 may be loaded, as indicated by event 64. Substantially simultaneously, either asynchronously or synchronously, events 66 and 68, indicating loading of JS FILE 1 and JS FILE 2 may also occur. At time $T_1$, which occurs later than $T_0$, JS FILE 3 may be called by JS FILE 1, and event 70 comprising loading of JS FILE 3 may occur. At time $T_2$, which occurs later than $T_1$ and $T°$, JS FILE 4 may be called by JS FILE 2, and event 72 comprising loading of JS FILE 4 may occur. If the XML configuration file is not found, JS FILE 1, and JS FILE 2 may also be loaded lazily; consequently, the event timing may vary from that indicated in the Figure. In addition, if JS FILE 2 is not used after loading JS FILE 4, JS FILE 2 can be removed from memory and deleted, saving memory resources.

Turning to FIG. 8, FIG. 8 is a simplified diagram illustrating example details 74 of JSON map file 46. Details 74 include three sections: (1) Bootstrap; (2) JavaScript; and (3) CSS. The Bootstrap section may select JavaScript files 24 and CSS files 26 that are to be loaded directly on initial application load. For example, the selected JavaScript files 24 and CSS files 26 can include a basic set of JavaScript objects or CSS elements needed for the initial application page to render correctly on browser 18. The JavaScript section comprises a map of substantially all JavaScript files 24 with related mapped methods listed against each JavaScript file for reverse mapping. The CSS section comprises a map of substantially all CSS files 26 with related maps for class names that can be used on various pages on application 20.

In some embodiments, the Bootstrap in the JSON file may be generated from declarations in a comma separated values (CSV) or equivalent file that specifies files to be included (e.g., include file as in /html/included-init) with relative paths of JavaScript files 24 and CSS files 26 to be loaded on application load initially without lazy loading. For example, the CSV file may be specified as follows: Page1.jsp,/html/js/test_init1.js,/html/css/css_init1.css; Page2.jsp,/html/js/test_init2.js,/html/css/css_init2.css.

Exclusion from the map file may be specified in another CSV exclusion file (e.g., /html/js/excluded-js && /html/js/excluded-css), that may include substantially all files with relative paths to be excluded from the map file, so that the methods are not asynchronously lazily loaded by browser 18. The excluded files may be loaded by the user by adding script/link tags manually or programmatically, or by any other suitable method as appropriate.

In various embodiments, the map file (e.g., map.json) generated on server 14 and including the relative file paths and methods and CSS classes listed in JSON format may be loaded by client side framework 30 on client 16. The files listed in the Bootstrap section of the JSON file may be directly loaded according to the respective page. When a call is made to a specific JavaScript method, client side framework 30 may intercept the call, reverse map the method from the map.JSON file, and lazy load the related JavaScript file asynchronously with timestamp to have the latest script available if needed. Subsequently, client side framework 30 may also make a callback to the related method for further execution. In addition, client side framework 30 may resolve dependencies by reverse mapping from the methods specified in the JSON map file. According to various embodiments, the map.JSON file may be parsed by client side framework 30. For onload of an application page, the related CSS class names referenced on the page may be used to reverse map to the relevant CSS files needed by the page to render correctly. Client side framework 30 may asynchronous load the appropriate CSS files.

Consider an example where a method is named dyna_load( ) The methods in relevant JavaScript files may be called using dyna_load.test1_method1(param1, param2); The JavaScript call may invoke client side framework 30 to refer to map.JSON file to find relevant file paths and other dependencies. If there is a call for method "test1_method1" in the file "/html/js/test_init1.js", client side framework 30 may detect it in the map file and asynchronously lazily load the "/html/js/test1.js" file. In addition, if "/html/js/test1.js" has a method call to "test3_method1", client side framework 30 may asynchronously lazily load the "/html/js/test3.js" file. According to various embodiments, any CSS class used on the page once parsed may be mapped to the required CSS file, which may be asynchronously lazily loaded. CSS load completion may be handled by client side framework 30, for example, so that the styles may be applied correctly, as desired.

According to various embodiments, no script or link tags are to be added manually with the JSON map file format. Client side framework 30 may load appropriate JavaScript files 24 and CSS files 26 optimally according to the map file. Memory resource usage at initial load of application 20 can be decreased by not loading all JavaScript files 24 and CSS files 26 referenced by application source code 22. Client side framework 30 may handle changes made to JavaScript files 24 and CSS files 26 on server 14, thus removing problems with changes not reflecting on client 16. Timestamp enabled load of JavaScript files 24 and CSS files 26 can facilitate loading browser 18 with a latest code added on server 14. Consequently, the developer may not have to explicitly code any of the JavaScript or CSS loads in application source code 22. Note that although JSON format can be parsed faster than other formats, any suitable format may be used for the map file within the broad scope of the embodiments. In various embodiments, browser 18, with help of server side framework 28 and client side framework 30 can handle appropriate loading of JavaScript files 24 and CSS files 26 when needed, thus eliminating unnecessary load on network and client systems.

In some embodiments, an advantage of using just the map file in JSON format includes earlier detection of conflicts at server 14. Thus, client 16 is self-aware of conflicts in the method names or CSS class names, facilitating the user to identify possible conflicts. Some embodiments may include an automatic conflict resolver framework (e.g., including objects with temporary naming convention) to facilitate improved user experience if required.

Figure 9:
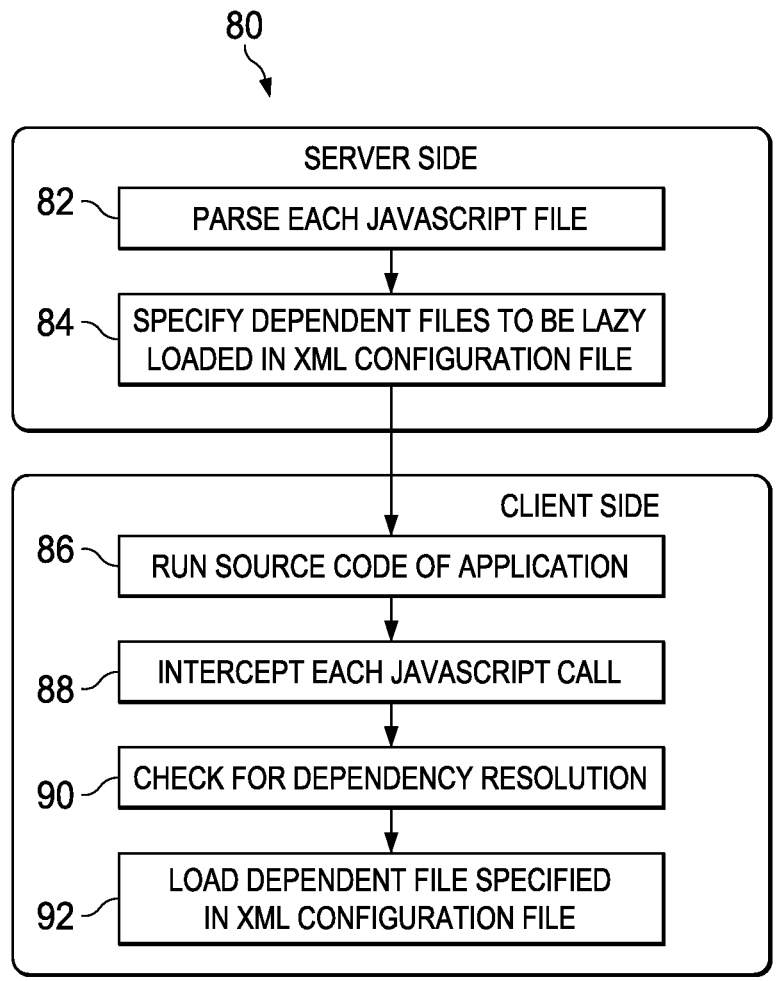
FIG. 9 is a simplified flow diagram illustrating example operations that may be associated with an embodiment of the communication system.

Turning to FIG. 9, FIG. 9 is a simplified flow diagram illustrating example operations 80 that may be associated with embodiments of communication system 10. At 82, each JavaScript file 24 may be parsed at server side framework 28. At 84, dependent JavaScript files 24 to be lazy loaded may be specified in XML configuration file 38 at server side framework 28. At 86, application source code 22 may be run (e.g., executed) at client 16. At 88, client side framework 30 may intercept each JavaScript call. At 90, client side framework 30 may check for dependency resolution. At 92, dependent files specified in XML configuration file 38 may be loaded appropriately by client side framework 30.

Figure 10:
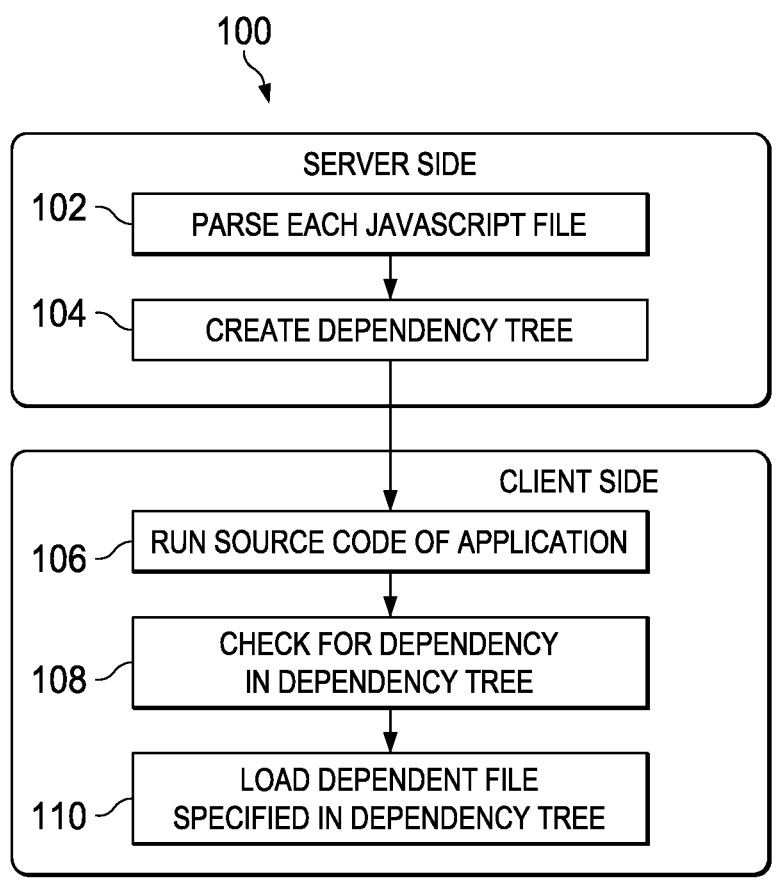
FIG. 10 is a simplified flow diagram illustrating other example operations that may be associated with an embodiment of the communication system.

Turning to FIG. 10, FIG. 10 is a simplified flow diagram illustrating example operations 100 that may be associated with embodiments of communication system 10. At 102, each JavaScript file 24 may be parsed at server side framework 28. At 104, dependency tree 42 may be generated at server side framework 28. At 106, application source code 22 may be run (e.g., executed) at client 16. At 108, client side framework 30 may check for dependency resolution in dependency tree 42. At 110, dependent files specified in dependency tree 42 may be lazily loaded by client side framework 30.

Figure 11:
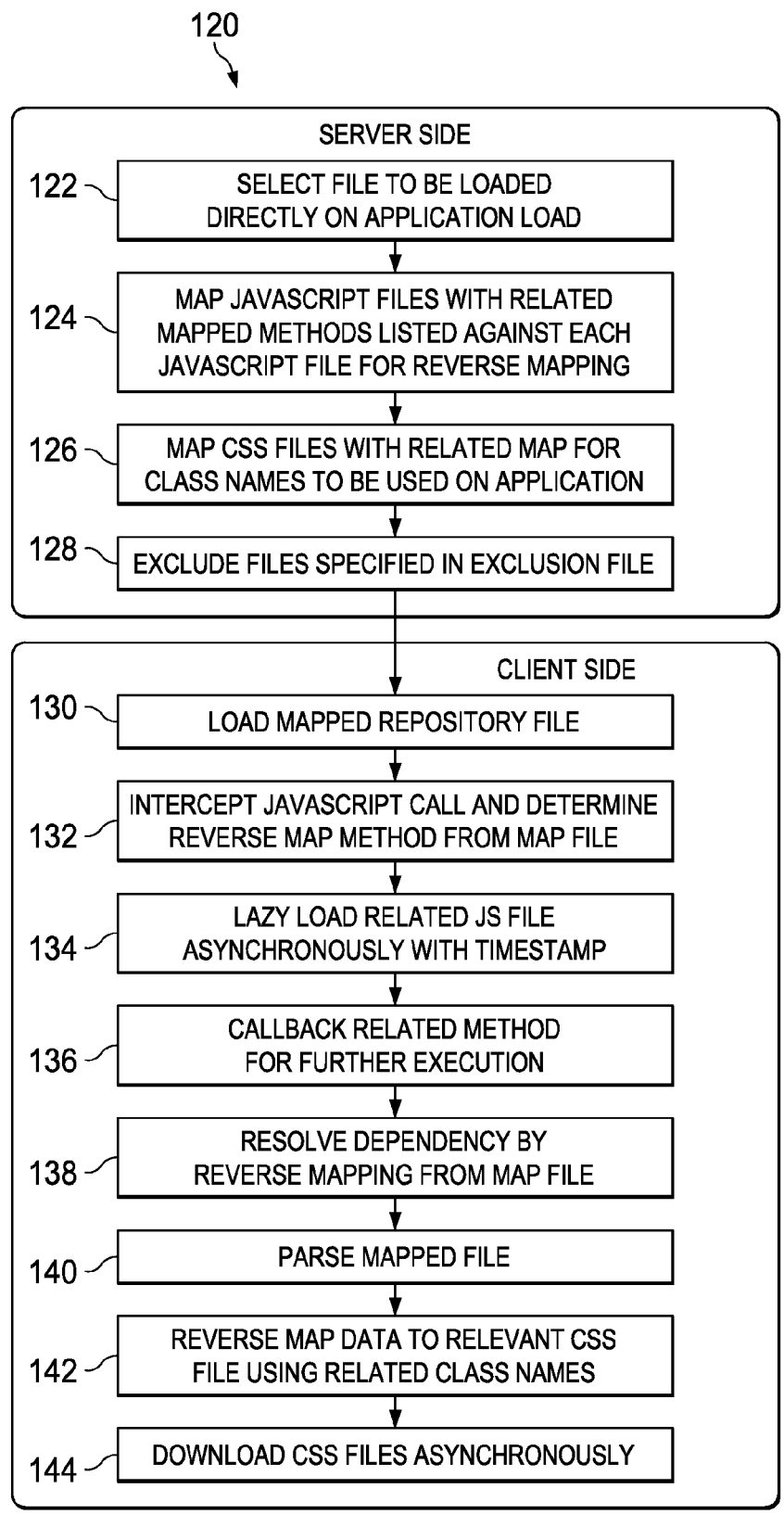
FIG. 11 is a simplified flow diagram illustrating yet other example operations that may be associated with an embodiment of the communication system.

Turning to FIG. 11, FIG. 11 is a simplified flow diagram illustrating example operations 120 that may be associated with embodiments of communication system 10. At 122, files to be loaded directly on application load may be selected. At 124, JavaScript files 24 may be mapped with related mapped methods listed against each JavaScript file 24 for reverse mapping. At 126, CSS files 26 may be mapped with related map for class names to be used on application 20. At 128, files excluded from asynchronous lazy loading may be specified in an exclusion file appropriately. Operations 122-128 may be executed on server 16 by server side framework 28.

At 130, the map file (also referred to as mapped repository file), which can include JSON map file 46 may be loaded at client side framework 30. At 132, client side framework 30 may intercept JavaScript calls and determine a reverse mapped method from the map file. At 134, the appropriate JavaScript files 24 may be asynchronously lazily loaded with timestamp. At 136, a callback of the related method may be performed for further execution. At 138, dependencies may be resolved by reverse mapping from the map file. At 140, the map file may be parsed. At 142, the map data may be reverse mapped to the relevant CSS files 26 using related class names. At 144, the related CSS files may be downloaded and loaded to memory asynchronously. Operations 130 to 144 may occur at client side framework 30.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of any executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, server side framework 28 and client side framework 30. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, server side framework 28 and client side framework 30 described and shown herein (and/or the associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 36, 52) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processors 34, 50) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
intercepting, at a client during execution of an application at a browser on the client, a JavaScript call, wherein a source code of the application indicates a timed sequence of execution of JavaScript files, wherein the JavaScript files comprise a first JavaScript file loaded into the client's memory element simultaneously with loading the application, a second JavaScript file having a dependency on the first JavaScript file and called during the timed sequence after the first JavaScript file is called, and a third JavaScript file not called after a certain duration of the timed sequence;
accessing, by the client, a map file stored at a server upon intercepting the JavaScript call, wherein the map file is generated automatically at the server before execution of the application on the client, wherein the map file includes a dependency tree comprising the JavaScript files used in the source code, wherein the first JavaScript file is specified in an exclusion file, wherein the map file maps the second JavaScript file for lazy loading, wherein the map file maps Cascading Style Sheets (CSS) files with related map for class names to be used on the application;
reverse mapping from the map file, at the client during runtime of the application, particular JavaScript files corresponding the JavaScript call, wherein the reverse mapping comprises checking the JavaScript call for dependency resolution according to the map file, wherein a resolution scope of lazily loaded files ends with first-level dependencies of such files, wherein the particular JavaScript files are selected for loading according to the dependency resolution;
loading the particular JavaScript files from the server into the client's memory element according to the exclusion file and the map file, wherein the loading comprises loading the first JavaScript file according to the exclusion file, lazy loading the second JavaScript file asynchronously with timestamp according to the map file, and reverse mapping relevant CSS files in the loaded files using related class names from the map file; and
deleting, during application execution, the third JavaScript file from the client's memory element after the certain duration of the timed sequence.

2. The method of claim 1, wherein the map file comprises an Extensible Markup Language (XML) configuration file, wherein the XML configuration file is generated by parsing each JavaScript file for the dependencies and the loading methods.

3. The method of claim 1, wherein the map file comprises a JavaScript Object Notation (JSON) file, wherein the JSON file is generated by parsing each JavaScript file and CSS file for methods and class names, respectively.

4. The method of claim 3, wherein the JSON file specifies substantially all JavaScript files and CSS files to be loaded asynchronously and certain other JavaScript files and CSS files to be loaded directly at initial application load, wherein any JavaScript files and CSS files excluded from asynchronous loading and loading directly at initial application load are specified in a separate exclusion file located at the server.

5. The method of claim 4, wherein substantially all JavaScript files and CSS files that are to be loaded asynchronously are lazily loaded with timestamps.

6. The method of claim 1, further comprising:
parsing the map file, wherein the executing application source code specifies onload of a page in the application, wherein the dependency tree of the map file specifies class names listed against corresponding Cascading Style Sheet (CSS) files;
determining related class names used on the page;
reverse mapping the map file using the class names to determine respective CSS files associated with the page; and
asynchronously loading the CSS files based on the reverse mapping.

7. The method of claim 1, further comprising:
checking the JavaScript call for dependency resolution according to the map file, wherein the map file specifies a first set of dependent JavaScript files to be lazily loaded and a second set of dependent JavaScript files to be loaded during initial application load;
lazily loading the first set of dependent JavaScript file; and
loading the second set of dependent JavaScript file during initial application load.

8. The method of claim 1, further comprising lazily loading substantially all dependent JavaScript files if the map file is not found.

9. The method of claim 8, wherein the JavaScript files are lazily loaded according to the dependency tree, wherein the dependency tree is generated at the server by parsing substantially all JavaScript files referenced by the application source code.

10. Non-transitory media encoded in logic that includes instructions for execution that when executed by a processor, is operable to perform operations comprising:
   intercepting, at a client during execution of an application at a browser on the client, a JavaScript call, wherein a source code of the application indicates a timed sequence of execution of JavaScript files, wherein the JavaScript files comprise a first JavaScript file loaded into the client's memory element simultaneously with loading the application, a second JavaScript file having a dependency on the first JavaScript file and called during the timed sequence after the first JavaScript file is called, and a third JavaScript file not called after a certain duration of the timed sequence;
   accessing, by the client, a map file stored at a server upon intercepting the JavaScript call, wherein the map file is generated automatically at the server before execution of the application on the client, wherein the map file includes a dependency tree comprising the JavaScript files used in the source code, wherein the first JavaScript file is specified in an exclusion file, wherein the map file maps the second JavaScript file for lazy loading, wherein the map file maps Cascading Style Sheets (CSS) files with related map for class names to be used on the application;
   reverse mapping from the map file, at the client during runtime of the application, particular JavaScript files corresponding to the JavaScript call, wherein the reverse mapping comprises checking the JavaScript call for dependency resolution according to the map file, wherein a resolution scope of lazily loaded files ends with first-level dependencies of such files, wherein the particular JavaScript files are selected for loading according to the dependency resolution;
   loading the particular JavaScript files from the server into the client's memory element according to the exclusion file and the map file, wherein the loading comprises loading the first JavaScript file according to the exclusion file, lazy loading the second JavaScript file asynchronously with timestamp according to the map file, and reverse mapping relevant CSS files in the loaded files using related class names from the map file; and
   deleting, during application execution, the third JavaScript file from the client's memory element after the certain duration of the timed sequence.

11. The media of claim 10, wherein the map file comprises an XML configuration file, wherein the XML configuration file is generated by parsing each JavaScript file for the dependencies and the loading methods.

12. The media of claim 10, wherein the map file comprises a JSON file, wherein the JSON file is generated by parsing each JavaScript file and CSS file for methods and class names, respectively.

13. The media of claim 10, wherein the operations further comprise:
   checking the JavaScript call for dependency resolution according to the map file, wherein the map file specifies a first set of dependent JavaScript files to be lazily loaded and a second set of dependent JavaScript files to be loaded during initial application load;
   lazily loading the first set of dependent JavaScript file; and
   loading the second set of dependent JavaScript file during initial application load.

14. The media of claim 10, wherein the operations further comprise lazily loading substantially all dependent JavaScript files if the map file is not found.

15. An apparatus, comprising:
   a browser;
   a memory element for storing data; and
   a processor that executes instructions associated with the data, wherein the processor and the memory element cooperate such that the apparatus is configured as a client for:
      intercepting, at the client during execution of an application at the browser, a JavaScript call, wherein a source code of the application indicates a timed sequence of execution of JavaScript files, wherein the JavaScript files comprise a first JavaScript file loaded into the client's memory element simultaneously with loading the application, a second JavaScript file having a dependency on the first JavaScript file and called during the timed sequence after the first JavaScript file is called, and a third JavaScript file not called after a certain duration of the timed sequence;
      accessing, by the client, a map file stored at a server upon intercepting the JavaScript call, wherein the map file is generated automatically at the server before execution of the application on the client, wherein the map file includes a dependency tree comprising the JavaScript files used in the source code, wherein the first JavaScript file is specified in an exclusion file, wherein the map file maps the second JavaScript file for lazy loading, wherein the map file maps Cascading Style Sheets (CSS) files with related map for class names to be used on the application;
      reverse mapping from the map file, at the client during runtime of the application, particular JavaScript files corresponding to the JavaScript call, wherein the reverse mapping comprises checking the JavaScript call for dependency resolution according to the map file, wherein a resolution scope of lazily loaded files ends with first-level dependencies of such files, wherein the particular JavaScript files are selected for loading according to the dependency resolution;
      loading the particular JavaScript files from the server into the client's memory element according to the exclusion file and the map file, wherein the loading comprises loading the first JavaScript file according to the exclusion file, lazy loading the second JavaScript file asynchronously with timestamp according to the map file, and reverse mapping relevant CSS files in the loaded files using related class names from the map file; and
      deleting, during application execution, the third JavaScript file from the client's memory element after the certain duration of the timed sequence.

16. The apparatus of claim 15, wherein the map file comprises an XML configuration file, wherein the XML configuration file is generated by parsing each JavaScript file for the dependencies and the loading methods.

17. The apparatus of claim 15, wherein the map file comprises a JSON file, wherein the JSON file is generated by parsing each JavaScript file and CSS file for methods and class names, respectively.

18. The apparatus of claim 15, further configured for:
checking the JavaScript call for dependency resolution according to the map file, wherein the map file specifies a first set of dependent JavaScript files to be lazily loaded and a second set of dependent JavaScript files to be loaded during initial application load;
lazily loading the first set of dependent JavaScript file; and
loading the second set of dependent JavaScript file during initial application load.

19. The apparatus of claim 18, further configured for lazily loading substantially all dependent JavaScript files if the map file is not found.

* * * * *